Patented July 11, 1950

2,515,036

UNITED STATES PATENT OFFICE 2,515,036

PEANUT BUTTER INCORPORATING SMOKED SMITHFIELD MEAT

Julius D. Gwaltney, Smithfield, Va.

No Drawing. Application December 11, 1947,
Serial No. 791,151

1 Claim. (Cl. 99—128)

This invention relates to a peanut butter spread having incorporated therein a relatively small proportion of smoked dry-salt cured pork meat of the type known as "Smithfield" meat.

The object of the invention is to provide a product which is predominately peanut butter, as contrasted with one that would be predominately meat, and in which the meat component, besides its obvious function of giving the peanut butter the flavor of Smithfield meat, performs at least two important functions which modify the characteristics of the product as well as enhancing its quality, in that it provides the mixture with all or a major portion of the salt required to season it, and has so little moisture content that when its salt content has been uniformly dispersed throughout the mixed mass, the average strength of salt throughout the mixture will be sufficient to preserve the meat.

Other objects of the invention will appear as the following description of a preferred and practical embodiment thereof proceeds.

The following formula is an example of a product coming within the scope of the invention:

Peanut butter, 28⅛ lbs. (440 oz.)
Smithfield meat, 7½ lbs. (120 oz.)
Peanut oil flakes, 18¾ oz.
Added salt, 6½ oz.

The peanut oil flakes may be considered a part of the peanut butter, since they represent a portion of the native peanut oil content of the peanut butter which has been made solid at room temperatures by hydrogenation, the purpose being to prevent separation of the oil and solids of the peanut butter in prolonged storage.

The amount of salt carried by Smithfield meat is about 9% the weight of the meat, so that in the above example the weight of the Smithfield meat employed represents about 11½ oz. of salt.

It is a known fact that the higher the moisture content of meat, the more salt is required to preserve it. For example, with reference to brine cured meat, a minimum of 10% its weight of salt is considered necessary. In the case of Smithfield meat, authoritative tests have shown that only 3% salt is sufficient to suppress the growth of the common pathogens, due to the low percentage of moisture present in the meat. The average moisture content of the mixture (peanut butter plus Smithfield meat) is about 4.50%.

In the above formula, in which the proportion of Smithfield meat to peanut butter was selected from the standpoint of obtaining a certain value of Smithfield flavor, there are about 580 oz. of mixture, requiring 3% or about 18 oz. of salt for the preservation of the meat. But there is only 11½ oz. of salt in the quantity of meat used, which explains the necessity for the added 6½ oz. of salt which figures in the formula.

The formula could be modified by increasing the proportion of Smithfield meat so that all the salt would be supplied by the meat alone. This would require about 13 lbs. of Smithfield meat, giving a much stronger Smithfield taste to the product, and considerably increasing its expense, so that while it may not seem commercially feasible, it is within the scope of the invention. In general, both from the standpoints of flavor value and economy, the amount of Smithfield meat employed will be less than enough to supply all the salt required, so that the addition of salt will be necessary.

The 3% average salt strength of the mixture which is essential to keep the meat constituent is well within the range of palatability. In fact, the salt strength may be increased possibly to 5% without adversely affecting the palatability of the product. Beyond this, it would be adjudged too salty by the average consumer.

One of the objections to a purely peanut butter spread is the tendency of the same to cling to the surfaces of the mouth. This is believed to be primarily due to great adhesion of peanut oil to the solids of the peanut butter, so that the solid particles are held together as a tenacious blanket which resists rupture and prevents access of air to the interface between it and the mouth surfaces, so that the mass is held by suction. It is found that "mouth stickiness" of the peanut butter spread is noticeably reduced through the incorporation of the Smithfield meat. It is believed that in the presence of the small percentage of moisture existing in the mixture, the globules of animal fat are different from the globules of vegetable fat in their adhesion characteristics toward the solids of the peanut butter, so that the distribution of the meat throughout the peanut butter mass lowers the viscosity of the oil which binds the solids particles.

In determining the permissible limits in the proportion of Smithfield meat to peanut butter, it may be said that while the quantity of meat is not critical, the invention contemplates a peanut butter spread flavored with Smithfield meat, and not a peanut butter flavored meat spread; consequently, the Smithfield meat content will be less than the peanut butter content. The maximum permissible amount of Smithfield meat is such as will impart to the mixture an average salt strength that does not exceed the limits of palatability, that is, from 3 to 5%. There is no critical minimum limit, this being determined solely by the intensity of the Smithfield meat flavor desired in the product.

While I have in the above disclosure described what I believe to be a preferred and practical embodiment of the invention, it will be understood by those skilled in the art that the specific proportions as disclosed are by way of example and not to be construed as limiting the scope of the invention.

What I claim as my invention is:

Peanut butter spread comprising peanut butter mixed with comminuted smoked dry-salt cured pork meat, characterized by the flavor of the meat, by reduced mouth stickiness compared to straight peanut butter and palatable degree of saltiness, the ratio of meat to peanut butter being substantially 1 to 4, said meat having a sufficiently low water content to require not substantially more than 3% to preserve it, said mixture containing a distributed quantity of salt derived solely from the meat, to equal or somewhat exceed 3% of the weight of the mixture.

JULIUS D. GWALTNEY.

REFERENCES CITED

The following references are of record in the file of this patent:

UNITED STATES PATENTS

| Number | Name | Date |
|---|---|---|
| 1,696,766 | Howe | Dec. 25, 1928 |
| 2,217,701 | Musher | Oct. 15, 1940 |
| 2,397,564 | Rosefield et al. | Apr. 2, 1946 |